United States Patent
Zaczek

(10) Patent No.: US 7,583,443 B2
(45) Date of Patent: Sep. 1, 2009

(54) REFLECTIVE OPTICAL ELEMENT FOR ULTRAVIOLET RADIATION, PROJECTION OPTICAL SYSTEM AND PROJECTION EXPOSURE SYSTEM THEREWITH, AND METHOD FOR FORMING THE SAME

(75) Inventor: Christoph Zaczek, Heubach (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 12/321,220

(22) Filed: Jan. 20, 2009

(65) Prior Publication Data

US 2009/0128894 A1 May 21, 2009

Related U.S. Application Data

(63) Continuation of application No. 11/434,439, filed on May 15, 2006, now abandoned.

(60) Provisional application No. 60/683,691, filed on May 23, 2005.

(51) Int. Cl.
*G02B 1/10* (2006.01)

(52) U.S. Cl. .................. 359/588; 359/359; 359/580; 359/589

(58) Field of Classification Search .............. 359/359, 359/577, 580, 586, 588, 589; 349/30, 113, 349/114

See application file for complete search history.

(56) References Cited

U.S. PATENT DOCUMENTS 6,310,905 B1 * 10/2001 Shirai .................... 372/99
2002/0071075 A1 * 6/2002 Ogino et al. ............ 349/113

* cited by examiner

*Primary Examiner*—Joshua L Pritchett
(74) *Attorney, Agent, or Firm*—Walter A. Hackler

(57) ABSTRACT

A reflective optical element (1) for radiation with a wavelength λ in the ultraviolet wavelength range comprises a reflective surface (6), and a dielectric multilayer system (4) formed on the reflective surface (6) which comprises at least two successive pairs of layers (5.$i$, 5.$i$+1), each pair of layers (5.1 to 5.N) consisting of a high refractive index layer ($H_1$ to $H_N$) alternating with a low refractive index layer ($L_1$ to $L_N$), wherein the optical thicknesses ($H_i$, $H_{i+1}$) of the high refractive index layers ($H_i$, $H_{i+1}$) and the optical thicknesses ($L_i$, $L_{i+1}$) of the low refractive index layers ($L_i$, $L_{i+1}$) of each adjacent pair of layers (5.$i$, 5.$i$+1) are different from each other.

16 Claims, 4 Drawing Sheets

REFLECTIVE OPTICAL ELEMENT FOR ULTRAVIOLET RADIATION, PROJECTION OPTICAL SYSTEM AND PROJECTION EXPOSURE SYSTEM THEREWITH, AND METHOD FOR FORMING THE SAME

CLAIM OF PRIORITY

The present application is a continuation of U.S. Ser. No. 11/434,439 filed May 15, 2006, now abandoned which claims benefit under 35 U.S.C. 119(e)(1) of U.S. Provisional Application No. 60/683,691, filed May 23, 2005. The disclosure of U.S. Provisional Application No. 60/683,691 filed May 23, 2005 and U.S. Ser. No. 11/434,439 filed May 15, 2006 are considered part of and are incorporated by reference in the disclosure of the present application.

TECHNICAL FIELD

The present invention relates to a reflective optical element for radiation with a wavelength λ in the ultraviolet wavelength range comprising: a reflective surface, and a dielectric multilayer system formed on the reflective surface, said dielectric multilayer system comprising at least two successive pairs of layers, each pair of layers consisting of a high refractive index layer alternating with a low refractive index layer, the invention further relates to a projection optical system and a projection exposure apparatus comprising at least one such a reflective optical element, and to a method for forming such a reflective optical element.

BACKGROUND

Reflective optical elements for radiation in the ultraviolet wavelength range are used e.g. in microlithography projection exposure apparatuses for redirecting or bending of a laser beam with a given center wavelength (e.g. 193 nm). For such reflective optical elements, a high reflectance to the incident radiation over a wide range of incident angles is desirable. Moreover, the difference in amplitude and phase of the reflectivity of a polarization component with an electrical field strength vector parallel to a plane formed by the normal vector of the reflective surface and the direction of the incident beam (p-polarized radiation) and a polarization component perpendicular to that plane (s-polarized radiation) should be as small as possible. This is because, if the reflectivity of such a reflective optical element for s-polarized radiation is significantly different from the reflectivity for p-polarized radiation, the different intensity and phase of the two polarization components in the reflected beam tend to degrade the imaging performance of the projection exposure apparatus, if not being compensated for.

For maximizing reflectance, it is well-known to superimpose a dielectric multilayer system enhanced over the overall mirror surface. The multi-layer system comprises alternating layers of high refractive index layers and low refractive index layers, each having an optical thickness of λ/4 for a given incident angle. However, such a multilayer system does only yield high reflectance and a small difference between polarization components in a narrow range of incident angles.

In order to solve the above problems U.S. Pat. No. 6,310,905 discloses a reflective optical element with a dielectric multilayer system consisting of an arrangement of high refractive index layers alternating with low refractive index layers such that each high refractive index layer follows a low refractive index layer shown by the representation:

$$L_1/[H/L_2]^x \qquad [1]$$

wherein $L_1$, $L_2$: represent the low refractive index layers

H: represents the high refractive index layers

X: defines an integer between 1 and 10

The above formula [1] defines a dielectric multilayer system in which a succession of pairs of high refractive index layers H alternating with low refractive index layers $L_2$ is superimposed over a first low refractive index layer $L_1$. The letters used for the high and low refractive index layers H, $L_1$, $L_2$ are also representative for the optical thickness of these layers, such that different optical thickness may be expressed in terms of those letters, e.g. $L_1 < L_2$. The letter X defines the repetition index, i.e. the number of times that the pair of layers $HL_2$ is repeated in the multilayer system.

A mirror with a dielectric multilayer system similar to the one described above, albeit more complex, is disclosed in U.S. Pat. No. 5,850,309. In this system, several pairs of layers consisting of a high refractive index layer alternating with a low refractive index layer—being separated by so-called bonding layers—are repeated.

OBJECT OF THE INVENTION

It is the object of the invention to provide a reflective optical element with a high reflectance as well as a small separation in amplitude and phase of the polarization component(s) of a reflected beam over a wide range of incident angles.

SUMMARY OF THE INVENTION

This object is achieved by a reflective optical element of the above-mentioned kind in which the optical thicknesses of the high refractive index layers and the optical thicknesses of the low refractive index layers of each adjacent pair of layers are different from each other.

The reflective optical element according to the invention comprises a dielectric multilayer system wherein no adjacent pair of layers has necessarily coinciding optical thicknesses of high and low refractive index layers, as required in [1].

The invention is based on the insight that dielectric multilayer system designs having periodic parts with pairs of alternating high and low refractive index layers in most cases lead to an inferior performance compared to multilayer systems with a design not showing such a periodicity. This is in particular the case when the dielectric layers absorb a portion of the incident radiation and the portion absorbed by the high and low refractive index layers is different.

Aperiodic designs are also advantageous in order to keep the amplitude difference and, in particular, the phase difference of the polarization components (s-, resp. p-polarization) in the reflected beam as small as possible. Especially, the occurrence of a phase shift between the two polarization components has not been addressed in the above-mentioned prior art such that the reflective optical elements described therein are not optimized in this respect. However, if not compensated for, a phase shift of the polarization components of a laser beam used in a microlithography projection exposure apparatus may lead to a degradation of its optical performance.

Although a design with two subsequent pairs of layers having high and low refractive index layers with the same optical thickness does not fall into the scope of the present invention, dielectric multilayer systems represented by layer arrangements with one layer thickness of subsequent pairs being identical, such as e.g. $H_1L_1H_1L_2$ or $L_1H_1L_1H_2$, $H_1 \neq H_2$, $L_1 \neq L_2$, fall into the scope of the present invention.

In one embodiment, the optical thicknesses of all high and low refractive index layers of the dielectric multilayer system are different from each other. In this particular case, all layers of the multilayer system have a different optical thickness, yielding a completely aperiodical design.

In a preferred embodiment, the optical thickness of the high and low refractive index layers is between $0.1\lambda$ and $0.35\lambda$. It is advantageous when the optical thickness of the dielectric layers fluctuates about the value of $0.25\lambda$.

In a highly preferred embodiment, the dielectric multilayer system further comprises a first low refractive index layer formed contiguous to the reflective surface having an optical thickness between $0.1\lambda$ and $0.2\lambda$. The first layer is used for phase adaptation to the reflective surface and has a smaller optical thickness compared to the other layers.

In a further highly preferred embodiment the optical thickness of the more absorbing layer material, in this case the high refractive index layers, decreases with increasing distance from the reflective surface. The optical power of the incident radiation (being proportional to the square of the field strength) decreases exponentially from the topmost dielectric layer of the multilayer system to the dielectric layer adjacent to the reflective surface. The higher the field strength in the optical material, the higher the absorption of radiation. It is therefore advantageous when the optical thickness of the high refractive index layers decreases with increasing field strength, such that the absorption of radiation is reduced in comparison to a pure periodic system.

In a preferred variant of this embodiment, the optical thickness of the low refractive index layers increases at least on average with increasing distance from the reflective surface. The term "at least on average" means that the optical thickness of the low refractive index layers increases, however not necessarily monotonic, such that for some layers, a small decrease in optical layer thickness may be tolerated. The increase of the optical thickness of the low refractive index layers with increasing distance from the reflective surface is advantageously combined with the decrease of the optical thickness of the high refractive index layers, particularly when the high refractive index layers show higher absorption than the low refractive index layers. Moreover, such a combination can also be advantageous for the purpose of minimization of the phase difference of polarization components.

In an alternative embodiment, the optical thickness of the low refractive index layers decreases with increasing distance from the reflective surface, which is particularly preferred for the reasons set out above when the optical materials of the low refractive index layers show higher absorption than the materials used for the high refractive index layers. In a preferred variant of this embodiment, the optical thickness of the high refractive index layers increases at least on average with increasing distance from the reflective surface.

In a highly preferred embodiment, the reflective surface is a surface of a metal film, in particular an aluminium film being formed contiguous to a substrate, the metal film preferably having a thickness smaller than 100 nm, in particular between 55 nm and 100 nm. The surface roughness and consequently the scattering of radiation at the aluminium film increase with increasing film thickness due to the increasing surface roughness. A thickness below 100 nm is therefore preferred. The substrate may be formed e.g. of synthetic quartz glass, or any metal fluoride mentioned above.

In a preferred embodiment, each high refractive index layer is composed of one or more materials selected from the group consisting of: lanthanum fluoride ($LaF_3$), gadolinium fluoride ($GdF_3$), aluminium oxide ($Al_2O_3$), neodymium fluoride ($NdF_3$), dysprosium fluoride ($DyF_3$), lead fluoride ($PbF_2$), hafnium oxide ($HfO_2$), and zirconium oxide ($ZrO_2$). The high refractive index layers may also be composed of compounds or mixtures of those materials.

In a further preferred embodiment, the low refractive index layers are composed of one or more materials selected from the group consisting of: aluminium fluoride ($AlF_3$), magnesium fluoride ($MgF_2$), sodium fluoride (NaF), lithium fluoride (LiF), thiolithe ($Na_5Al_3F_{14}$), cryolite ($Na_3AlF_6$), silicon oxide ($SiO_2$), calcium fluoride ($CaF_2$), barium fluoride ($BaF_2$), and strontium fluoride ($SrF_2$). The low refractive index layers may also be composed of compounds or mixtures of those materials The invention is further realized in a projection optical system for forming an image of a pattern arranged on a mask on a photosensitive substrate, comprising at least one reflective optical element as described above. Preferably, the reflective optical element is a concave reflector of a catadioptric projection optical system, as the requirements regarding reflectance and polarization conservation for such an element are generally very high. Alternatively or in addition, the reflective optical element can be realized as one of a first deflecting mirror arranged in an optical path before the concave reflector and a second deflecting mirror arranged in an optical path after the concave reflector. The angles of incidence for these mirrors are relatively large, so that the designs described above can be advantageously applied in this case.

The invention further relates to a projection exposure apparatus for radiation in the ultraviolet wavelength range, comprising: an illuminating system for illuminating a mask, and a projection optical system for forming an image of a pattern arranged on said mask on a photosensitive substrate, said projection exposure apparatus further comprising at least one reflective optical element as described above. The at least one reflective optical element is preferably arranged in the illumination system and/or the projection optical system of the apparatus. Thus, the improved properties of the multilayer designs of the reflective optical elements described above can be advantageously applied in microlithography systems.

The invention is also realized in a method for forming a reflective optical element for radiation with a wavelength $\lambda$ in the ultraviolet wavelength range comprising the steps of: forming a metal film, in particular an aluminium film, on a substrate with a thickness preferably below 100 nm, in particular between 55 nm and 100 nm, a surface of the metal film forming a reflective surface; forming a dielectric multilayer system on the reflective surface starting with a first low refractive index layer with an optical thickness between $0.1\lambda$ and $0.2\lambda$, superimposing over the first layer at least two successive pairs of layers, each pair of layers consisting of a high refractive index layer alternating with a low refractive index layer, wherein the optical thicknesses of the high refractive index layers and the optical thicknesses of the low refractive index layers of each adjacent pair of layers are different from each other. The layers may be formed on the substrate by a technique such as thermal evaporation, ion assisted deposition, and sputtering.

Further features and advantages of the invention can be extracted from the following description of an embodiment of the invention, with reference to the figures of the drawing which show inventive details, and from the claims. The individual features can be realized individually or collectively in arbitrary combination in a variant of the invention.

DRAWING

The schematic drawing shows an embodiment which is explained in the following description.

Figure 1:
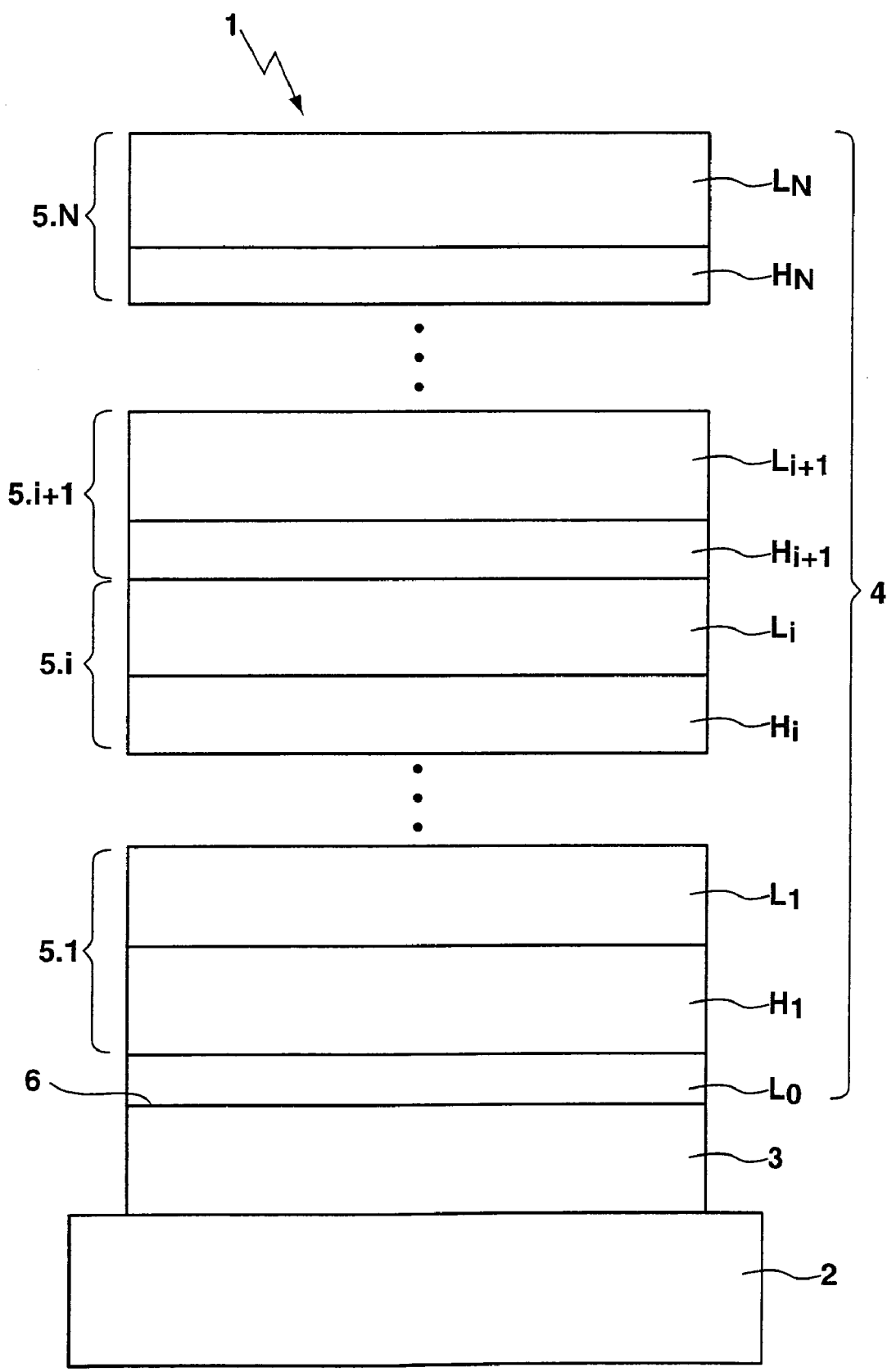
FIG. 1 shows an embodiment of a reflective optical element for radiation with a wavelength in the ultraviolet wavelength range according to the invention.

FIG. 1 shows a reflective optical element 1 for radiation with a wavelength λ in the ultraviolet wavelength range (in the present case, λ=193 nm) which may be used in a microlithography projection exposure apparatus for redirecting or bending a laser beam. The reflective optical element 1 comprises a substrate 2 of synthetic quartz glass on which an aluminium film 3 with a thickness of between 55 nm and 100 nm is formed. On top of the aluminium film 3, a dielectric multilayer system 4 is formed, starting with a first low refractive index layer $L_0$ adjacent to a surface 6 of the aluminium film 3 and followed by a succession of a number N ($\leq 50$) of pairs of layers 5.1 to 5.N. Each pair of layers 5.1 to 5.N consists of a high refractive index layer $H_1$ to $H_N$ alternating with a low refractive index layer $L_1$ to $L_N$, the letters $H_i$, $L_i$ ($1 \leq i \leq N$) also representing the optical thicknesses of the layers in units of the incident wavelength:

$$H_i, L_i = \frac{n_{Li,Hi} d_{Li,Hi} \cos(\alpha_i)}{\lambda}, \text{ wherein:}$$

$H_i$ and $L_i$ define the optical thickness of the high and low refractive index layers with layer number i, $1 \leq i \leq N$;

$n_{Li,Hi}$ is the refractive index of the low resp. high refractive index layer with layer number i;

$d_{Li, Hi}$ is the thickness of the low resp. high refractive index layer with layer number i $\alpha_i$ is the angle of incidence of the beam inside layer number i; and λ is the wavelength of the incident beam.

For two adjacent pairs of layers 5.i, 5.i+1, the respective optical thicknesses of the high refractive index layers $H_i$, $H_{i+1}$ and the low refractive index layers $L_i$, $L_{i+1}$ are different, i.e. $H_i \neq H_{i+1}$ and $L_i \neq L_{i+1}$ for all i.

In accordance with the above notation, the dielectric multilayer system 4 shown in FIG. 1 can be represented by the following formula:

$$L_0 H_1 L_1 H_2 L_2 \ldots H_i L_i H_{i+1} L_{i+1} \ldots H_{N-1} L_{N-1} H_N L_N \quad [2]$$

wherein $L_0$ lies in a range of between 0.1 and 0.2 and $H_i$, $L_i$ in a range between 0.1 and 0.35 (in units of the wavelength λ).

In the following, two examples for dielectric multilayer system designs according to the formula [2] are described and compared with the state of the art by numerical simulations of the respective optical performance of these systems.

In the first example described in connection with FIG. 2, the design target for the dielectric multilayer system is to achieve an average reflectance $R_a$ of more than 96% at a wavelength of 193 nm in a range of incident angles from 30° to 60°, while the average difference of amplitude $R_s$-$R_p$ and phase $PR_p$-$PR_s$ of both polarization components (s and p) should be as small as possible. The high and low refractive index layers are defined by the (complex) indices of refraction $n_H$=1.778−i 0.0026, and $n_L$=1.359−i 0.0004, respectively, the imaginary part representing absorption occurring in the optical media of these layers. The total number of layers of the design must not exceed 15.

The optimized design with 15 layers and the above constraints in accordance with the formula [1] of prior art document U.S. Pat. No. 6,310,905 has been found to be 0.128/[0.253/0.257]$^7$, the overall thickness of this design being 530 nm. The optical thicknesses of the low refractive index layers are represented in FIG. 2 by the symbol ●, the optical thicknesses of the high refractive index layers by the symbol ▲, both for a wavelength of λ=193 nm and an angle of incidence of α=49.1°. With this design, the merit function (representing the deviation of the design result from the design target, i.e. the smaller the better) is 79.02, the average difference of the amplitudes of the polarization components in the reflected beam is $R_s$-$R_p$=1.7%; their average difference of phase $PR_s$-$PR_p$=2.1°, and the average reflectance (including both polarization components) is $R_a$=95.8%.

The performance of the design described above is compared to an aperiodic design with 13 layers according to the formula [2], having an overall thickness of 465 nm, wherein $L_0$=0.153

$H_1$=0.259

$L_1$=0.243

$H_2$=0.254

$L_2$=0.244

$H_3$=0.248

$L_3$=0.250

$H_4$=0.237

$L_4$=0.265

$H_5$=0.219

$L_5$=0.310

$H_6$=0.184

Figure 2:
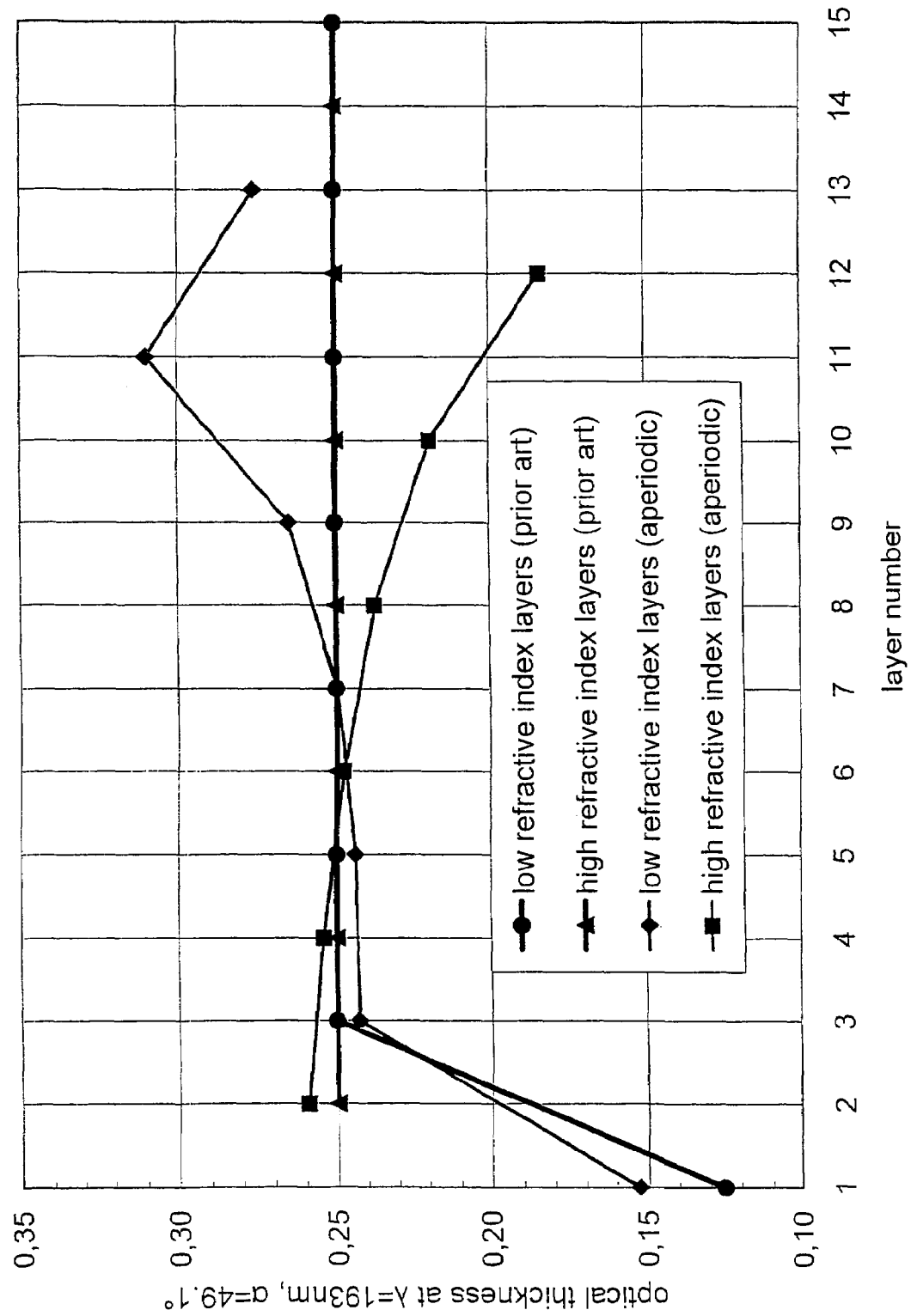
FIG. 2 shows a diagram of the optical thicknesses of the layers of a first dielectric multilayer system design of the embodiment of FIG. 1 compared to a state-of-the-art design.

$L_6$=0.276 are the respective optical layer thicknesses, being represented in FIG. 2 by the symbol ◆ for the low refractive index layers and by the symbol ■ for the high refractive index layers.

The aperiodic design as described above has a merit function of 63.23 with an average difference of amplitude $R_s$-$R_p$=1.7% and an average difference of phase $PR_s$-$PR_p$=1.4° of the two polarization components as well as an average reflectance of $R_a$=95.9%. The aperiodic design is therefore clearly superior in its optical performance compared to the design of the prior art. Moreover, such an improved performance is achieved while the total thickness of the multilayer system is reduced from 530 nm to 465 nm and the number of layers is reduced from 15 to 13.

Such a result is possible as the optical thickness of the more absorbing high refractive index layers $H_i$ of the aperiodic design decreases with increasing distance from the aluminium film 3, whereas the optical thickness of the less absorbing low refractive index layers $L_i$ increases. As the high refractive index material shows larger absorption than the low refractive index material due to the larger imaginary part of the refractive index $Im(n_H)=0.0026>Im(n_L)=0.0004$ and the optical power of the incident radiation and consequently the absorption increases with increasing distance from the aluminium film 3, it is advantageous to reduce the optical thickness of the high refractive index layers $H_i$ with increasing distance from the aluminium film 3, respectively to increase the optical thickness of the low refractive index layers $L_i$, such that most of the part of the multilayer system 4 being exposed to radiation with a high optical power is covered by the less-absorbing low refractive index layers $L_i$. In contrast to this, the state-of-the-art design has almost identical layer thicknesses for all pairs of layers, see FIG. 2, such that absorption effects cannot be taken into account.

Figure 3:
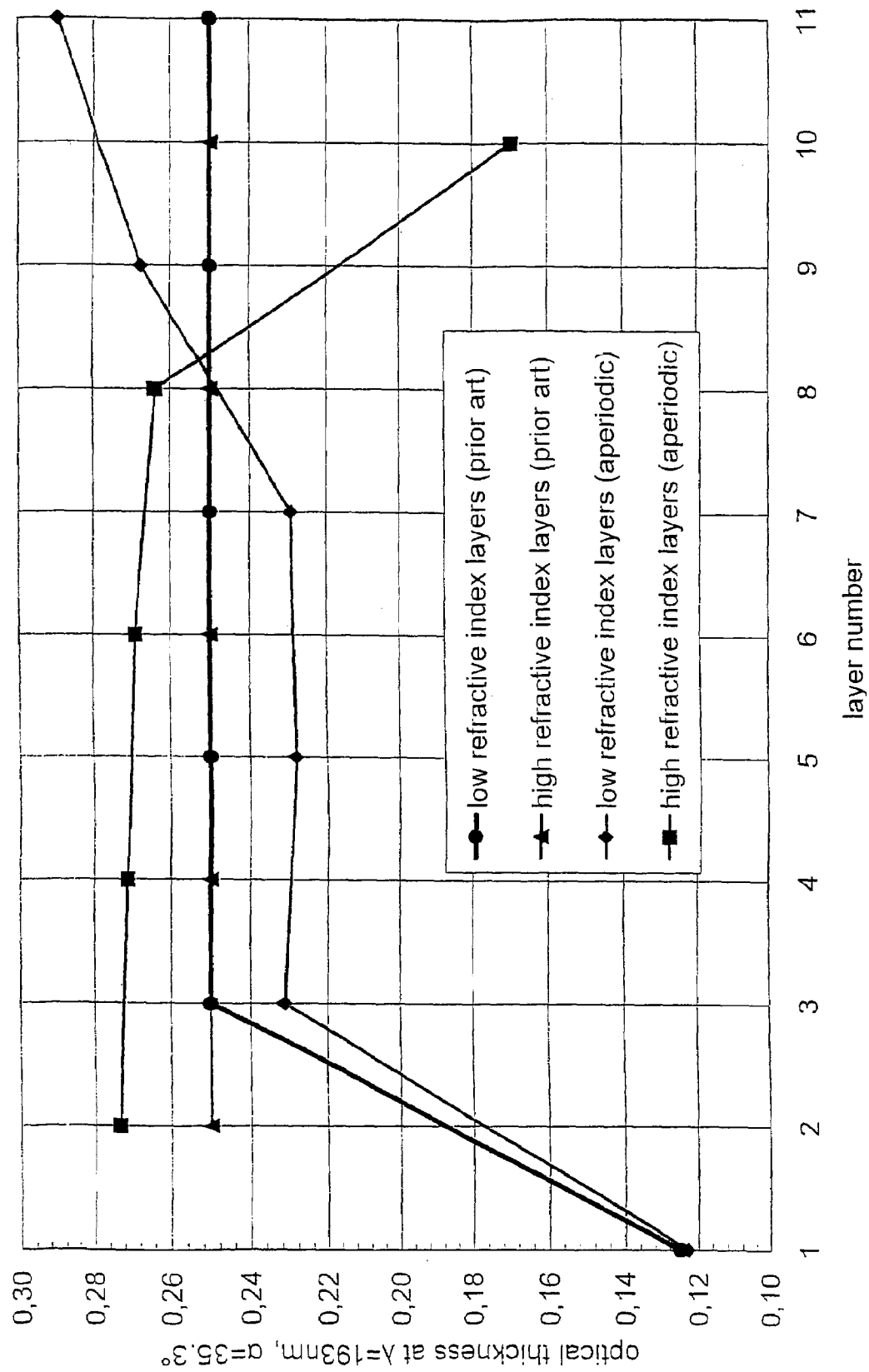
FIG. 3 shows an analogous diagram for a second dielectric multilayer system design of the embodiment of FIG. 1, being optimized to minimize the phase shift between polarization components of a reflected beam.

With reference now to FIG. 3, a second comparison of an aperiodic multilayer system design with a periodic multilayer system is carried through. In this case, the design target is to achieve an average reflectance $R_a$ of more than 98% (with a wavelength of 193 nm and a range of incident angles from 0° to 45°), the average difference of amplitude $R_s-R_p$ and phase $PR_p-PR_s$, of both polarization components of the reflected beam being as small as possible. The high and low refractive index layers are defined by real indices of refraction $n_H=1.745$ and $n_L=1.359$, so that no absorption in the optical media of these layers is present. The total number of layers is limited to 11.

The optimized design (best case) with 11 layers and the above constraints in accordance with the formula [1] of prior art document U.S. Pat. No. 6,310,905 is given by $0.125/[0.25/0.25]^5$, the multilayer system having an overall thickness of 362 nm. The optical thicknesses of the low refractive index layers are represented in FIG. 3 for a wavelength of $\lambda=193$ nm and an angle of incidence of $\alpha=35.3°$. With this design, the merit function is 50.2, the average difference of amplitude is $R_s-R_p=0.5\%$, the average difference of phase is $PR_s-PR_p=0.2°$, and the average reflectance is $R_a=98.4\%$.

The aperiodic design optimized for this design target consists of 11 layers with an overall thickness of 361 nm, wherein $L_0=0.123$ $H_1=0.273$ $L_1=0.231$ $H_2=0.271$ $L_2=0.228$ $H_3=0.269$ $L_3=0.229$ $H_4=0.264$ $L_4=0.267$ $H_5=0.169$ $L_5=0.290$ are the respective optical layer thicknesses, being represented in FIG. 3.

The aperiodic design has a merit function of 45.3 with an average difference of amplitudes of the reflected beam of $R_s-R_p=0.5\%$, an average difference of phase $PR_s-PR_p=0.1°$, and an average reflectance of $R_a=98.4\%$. The optical performance of the aperiodic design is therefore still superior to the periodic design of the prior art (although not as distinctively as in the first example). In both cases, the number of layers is equal and the overall thickness of the multilayer system is almost identical.

However, the main difference in performance of the two designs of FIG. 3 is that the phase difference of the polarization components is much smaller in the aperiodic design than in the periodic design of the state of the art. Consequently, even in case that no absorption in the layers of the dielectric layer system occurs (which is only a theoretically assumption, as absorption is always present in real systems), the aperiodic design can be used to reduce the phase difference between polarization components.

The optical materials of the high refractive index layers $H_i$ of FIG. 1 can be selected from a multitude of materials, including lanthanum fluoride ($LaF_3$), gadolinium fluoride ($GdF_3$), aluminium oxide ($Al_2O_3$), neodymium fluoride ($NdF_3$), dysprosium fluoride ($DyF_3$), lead fluoride ($PbF_2$), hafnium oxide ($HfO_2$), and zirconium oxide ($ZrO_2$). Likewise, the optical materials for the low refractive index layers $L_i$ can be chosen from the group of materials including aluminium fluoride ($AlF_3$), magnesium fluoride ($MgF_2$), sodium fluoride (NaF), lithium fluoride (LiF), thiolithe ($Na_5Al_3F_{14}$), cryolite ($Na_3AlF_6$), silicon oxide ($SiO_2$), calcium fluoride ($CaF_2$), barium fluoride ($BaF_2$), and strontium fluoride ($SrF_2$). It is also not necessary to use the same optical material for all of the high, respectively low refractive index layers $H_i$, $L_i$ of the dielectric layer system 4.

Also, the reflective optical element 1 as shown in FIG. 1 represents only one of a plurality of possible realizations of the inventive concept. It is e.g. also possible that the dielectric layer system starts with a high reflective index layer at the aluminium layer film, as is the case e.g. with the (periodic) designs described in U.S. Pat. No. 5,850,309.

Figure 4:
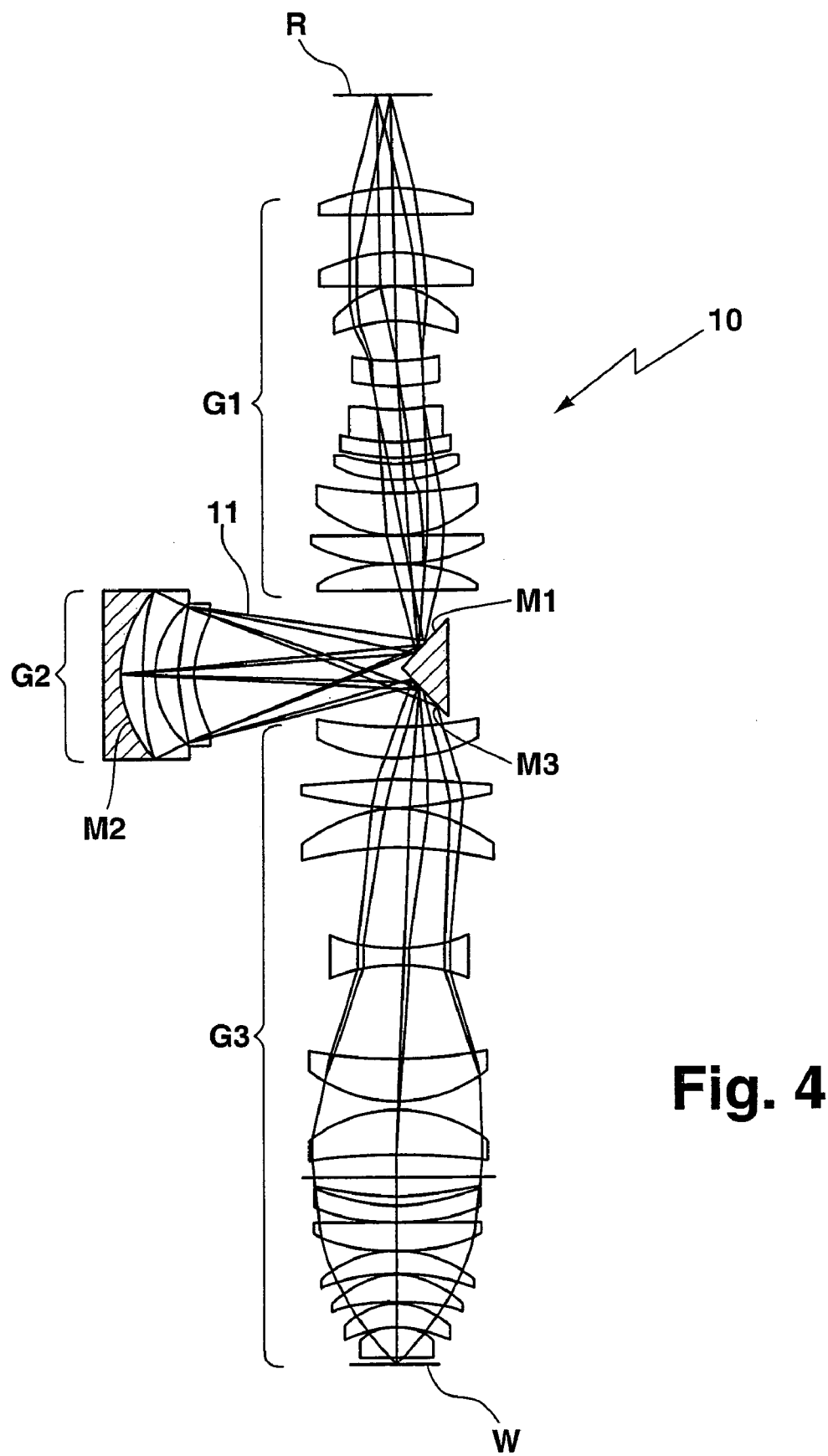
FIG. 4 shows a catadioptric projection optical system having three reflective optical elements according to the invention.

Reflective optical elements as described above may be advantageously applied e.g. in projection exposure apparatuses for microlithography. Such an apparatus generally comprises an illuminating system and a projection optical system. FIG. 4 shows a projection optical system 10 of such an apparatus which forms an image of a pattern on a mask (reticle) being arranged in a reticle plane R on a photosensitive substrate arranged in a wafer plane W. The projection optical system 10 is a catadioptric system having a concave reflector M2 which is arranged in a beam path 11 between a first deflecting mirror M1 and a second deflecting mirror M3.

The projection optical system 10 comprises three image forming systems G1 to G3, each of which with a plurality of transmissive optical elements, i.e. lens elements, the arrangement and optical function of which is beyond the scope of the present invention and will therefore not be described herein; for a detailed description of the image forming systems G1 to G3, reference is made to WO 2004.019128. In the following, we will focus on the general properties of eth image forming systems G1 to G3 and especially the reflective optical elements arranged therein.

The first, dioptric image forming system G1 comprises only transmissive elements and images the pattern on the reticle plane R on a first intermediate image (not shown) which is located before the first deflecting mirror M1. The second, catadioptric image forming system G2 comprises the first deflecting mirror M1 and the concave reflector mirror M2 and is used for generating a second intermediate image on the basis of the first intermediate image. The second intermediate image is imaged on the waver plane W by the third, catadioptric image forming system G3 via the second deflecting mirror M3. It is understood by the person skilled in the art that for the purpose of imaging, each of the image forming systems G1 to G3 comprises a pupil plane, the concave reflector M2 being located in the pupil plane of the second image forming system G2.

The first and second deflecting mirrors M1, M3 as well as the concave reflector M2 are designed as reflective optical elements having a dielectric multilayer system as described above. In this way, the advantageous properties of the layer designs described herein, i.e. high reflectance and small separation of polarization components, can be applied for the purpose of UV and VUV microlithography. The skilled person will appreciate that the inventive reflective elements described above may equally be applied in illuminating systems of projection exposure apparatuses for microlithography and in other optical systems for the ultraviolet wavelength range, respectively.

What is claimed is:

1. Reflective optical element comprising:
   a reflective surface, and
   a dielectric multilayer system formed on said reflective surface,
   said dielectric multilayer system comprising at least four successive pairs of layers, each of said pairs of layers consisting of a high refractive index layer alternating with a low refractive index layer, said dielectric multilayer system being reflective for a wavelength $\lambda$ in the ultraviolet wavelength range,
   wherein said optical thickness of said low refractive index layers increases at least on average with increasing distance from said reflective surface, and
   wherein the total optical thickness of said high refractive index layers of the three pairs of layers having the closest distance to said reflective surface and the total optical thickness of said low refractive index layers of the three pairs of layers having the largest distance from said reflective surface each is higher than 3 times $\lambda/4$, and
   wherein the total optical thickness of said low refractive index layers of said three pairs having the closest distance to the reflective surface and the total optical thickness of said high refractive index layers of said three pairs of layers having the largest distance from said reflective surface each is lower than 3 times $\lambda/4$.

2. Reflective optical element according to claim 1, wherein said optical thickness of said high and low refractive index layers is between $0.1\lambda$ and $0.35\lambda$.

3. Reflective optical element according to claim 1, wherein said dielectric multilayer system further comprises a first low refractive index layer formed contiguous to said reflective surface having an optical thickness between $0.1\lambda$ and $0.2\lambda$.

4. Reflective optical element according to claim 1, wherein said optical thickness of said high refractive index layers decreases with increasing distance from said reflective surface.

5. Reflective optical element according to claim 1, wherein said reflective surface is a surface of metal film being formed contiguous to a substrate, said metal film preferably having a thickness smaller than 100 nm, in particular between 55 nm and 100 nm.

6. Reflective optical element according to claim 1, wherein each of said high refractive index layers is composed of one or more materials selected from the group consisting of: lanthanum fluoride ($LaF_3$), gadolinium fluoride ($GdF_3$), aluminum oxide ($Al_2O_3$), neodymium fluoride ($NdF_3$), dysprosium fluoride ($DyF_3$), lead fluoride ($PbF_2$), hafnium oxide ($HfO_2$), and zirconium oxide ($ZrO_2$).

7. Reflective optical element according to claim 1, wherein each of said low refractive index layers is composed of one or more materials selected from the group consisting of: aluminum fluoride ($AlF_3$), magnesium fluoride ($MgF_2$), sodium fluoride (NaF), lithium fluoride (LiF), thiolithe ($Na_5Al_3F_{14}$), cryolite ($Na_3AlF_6$), silicone oxide ($SiO_2$), calcium fluoride ($CaF_2$), barium fluoride ($BaF_2$), and strontium fluoride ($SrF_2$).

8. Projection optical system for forming an image of a pattern arranged on a mask on a photosensitive substrate, comprising at least one reflective optical element according to claim 1.

9. Projection optical system according to claim 8, wherein said reflective optical element is a concave reflector.

10. Projection optical system according to claim 8, wherein said reflective optical element is a deflecting mirror arranged in an optical path before a concave reflector.

11. Projection optical system according to claim 8, wherein said reflective optical element is a deflecting mirror arranged in an optical path after a concave reflector.

12. Projection exposure apparatus for radiation in the ultraviolet wavelength range, comprising:
   an illuminating system for illuminating a mask, and
   a projection optical system for forming an image of a pattern arranged on said mask on a photosensitive substrate, said projection exposure apparatus further comprising at least one reflective optical element according to claim 1.

13. Projection exposure apparatus according to claim 12, wherein said at least one reflective optical element is arranged in said illumination system.

14. Projection exposure apparatus according to claim 12, wherein said at least one reflective optical element is arranged in said projection optical system.

15. Method for forming a reflective optical element for radiation with a wavelength $\lambda$ in the ultraviolet wavelength range, said method comprising the steps of:
   forming a metal film on a substrate with a thickness below 100 nm, a surface of the metal film forming a reflective surface,
   forming a dielectric multilayer system on said reflective surface starting with a first low refractive index layer with an optical thickness between $0.1\lambda$ and $0.2\lambda$ superimposing over said first layer at least four successive pairs of layers, each pair of layers consisting of a high refractive index layer alternating with a low refractive index layer, wherein
   wherein said optical thickness of said low refractive index layers increases at least on average with increasing distance from said reflective surface, and
   wherein the total optical thickness of said high refractive index layers of the three pairs of layers having the closest distance to said reflective surface and the total optical thickness of said low refractive index layers of the three pairs of layers having the largest distance from said reflective surface each is higher than 3 times $\lambda/4$, and
   wherein the total optical thickness of said low refractive index layers of said three pairs of layers having the closest distance to the reflective surface and the total optical thickness of said high refractive index layers of said three pairs of layers having the largest distance from said reflective surface each is lower than 3 times $\lambda/4$.

16. Method according to claim 15, wherein said high and low refractive index layers are formed on said substrate by a deposition method selected from the group consisting of thermal evaporation, ion assisted deposition, and sputtering.

* * * * *